United States Patent [19]
Launder

[11] 4,029,052
[45] June 14, 1977

[54] CONVEYING AND WEIGHING SYSTEM

[76] Inventor: James Mark Launder, 207 Louella, Nokomis, Fla. 33555

[22] Filed: Nov. 11, 1975

[21] Appl. No.: 631,138

[52] U.S. Cl. .................................. 119/52 AF
[51] Int. Cl.² ................................ A01K 5/02
[58] Field of Search ......... 119/52 AF, 51.11, 51 R; 222/318, 412; 177/83, 105, 145; 198/39

[56] References Cited
UNITED STATES PATENTS

| | | | |
|---|---|---|---|
| 2,003,417 | 6/1935 | Andreas | 222/318 UX |
| 3,904,082 | 9/1975 | Hostetler | 119/51.11 X |

Primary Examiner—Hugh R. Chamblee
Attorney, Agent, or Firm—John J. Swartz

[57] ABSTRACT

A poultry feeding system including a feed supply hopper for supplying feed, a supply conveyor connected to said supply hopper, weighing mechanism connected to said supply hopper for weighing the feed, a discharge conveyor for delivering the weighed material to a plurality of poultry feed stations, and a bypass conveyor, connected to the supply and discharge conveyors for bypassing the weighing mechanism if the weighing mechanism is disabled.

21 Claims, 4 Drawing Figures

CONVEYING AND WEIGHING SYSTEM

BACKGROUND OF THE INVENTION

This invention relates to apparatus for weighing fluent solid materials which are conveyed from a material supply station to a material discharge station and more particularly to a fail-safe conveying system which will insure delivery of feed to the discharge station if all or a portion of the weighing apparatus is disabled.

Animal feeding systems have been provided for distributing feed to a plurality of feed stations. It is important that the operator know precisely the amount of feed that is being fed. Systems of the type disclosed herein include a conveyor line having an auger which conveys feed in a downstream path of travel to a poultry house and a weighing assembly to weigh the feed such that the operator has an accurate account of the feed being dispensed. If the feed weigher assembly is installed in series circuit with the conveyor line, delivery of feed to the poultry house will be interrupted if the weighing assembly is disabled. Accordingly, it is an object of the present invention to provide a new and novel feed conveying system including a weighing assembly for weighing the feed connected in parallel circuit with a portion of the conveying line.

It is another object of the present invention to provide a fail-safe feed conveying and weighing system which removes the feed from an upstream portion of a feed supply auger, weighs the feed, and returns the weighed feed to a portion of the feed supply auger downstream of upstream portion for continued travel to a chicken house.

It is yet another object of the present invention to provide an in-line conveyor and feed weighing and bypass mechanism for causing the feed to bypass a portion of the in-line conveyor and weighing the feed and then returning the feed to the conveyor, the conveyor being operative to convey feed past the feed weighing and bypass mechanism in the event that the feed weighing and bypassing mechanism is inadvertently rendered inoperative.

It is still another object of the present invention to provide conveying and weighing apparatus of the type described which is confined within a predetermined space envelope.

It is yet another object of the present invention to provide a method of conveying fluent solid material from a supply station to a weighing station, weighing the material at the weighing station, discharging the weighed material to a discharge station, and bypassing the weighing station by conveying other material from the supply station past the weighing station in the event that the weighing step is inadvertently interrupted.

Other objects and advantages of the present invention will become apparent to those of ordinary skill in the art as the description thereof proceeds.

SUMMARY OF THE INVENTION

A system for feeding animals and the like comprising a conveying line for moving feed and the like, in an in-line, downstream path of travel from a supply station toward a discharge station, and weighing and bypass mechanism connected to said conveying line for causing the material to bypass a portion of the conveying line and weighing the bypassed feed, the conveying line being operative to convey feed from the supply station past at least a portion of the weighing and bypass mechanism, in the event that the feed weighing and bypass mechanism is inadvertently rendered inoperative.

The present invention may more readily be understood by reference to the accompanying drawings, in which.

DESCRIPTION OF THE INVENTION

Figure 1:
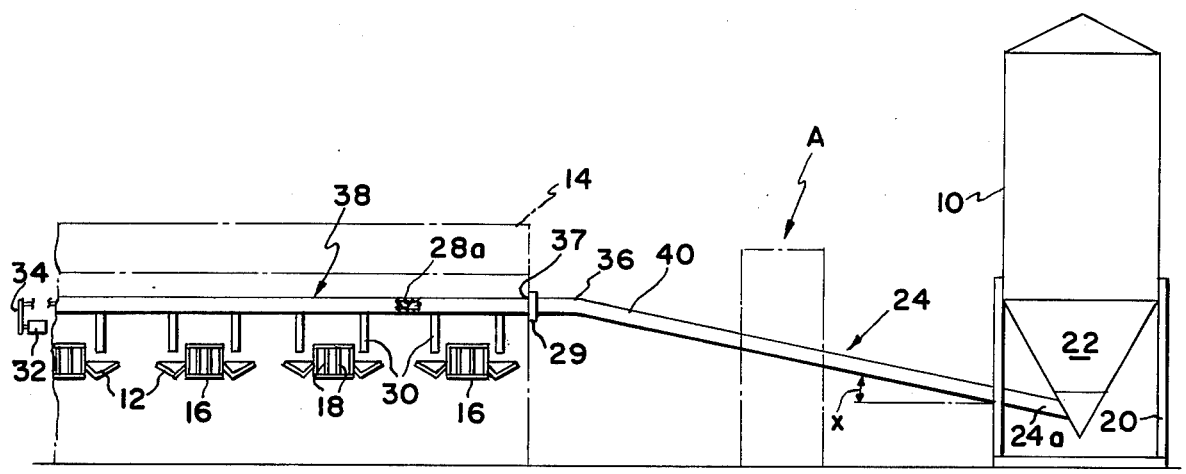
FIG. 1 is a side elevational view of a system incorporating the present invention.
Figure 3:
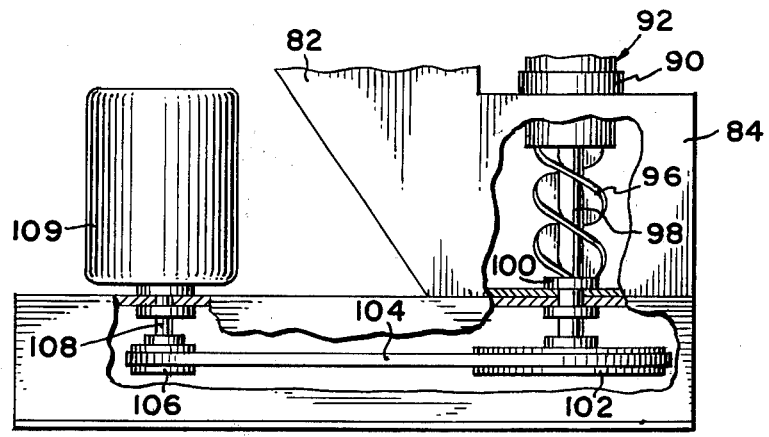
FIG. 3 is an enlarged side elevational view of a portion of the apparatus illustrated in FIG. 2.
Figure 4:
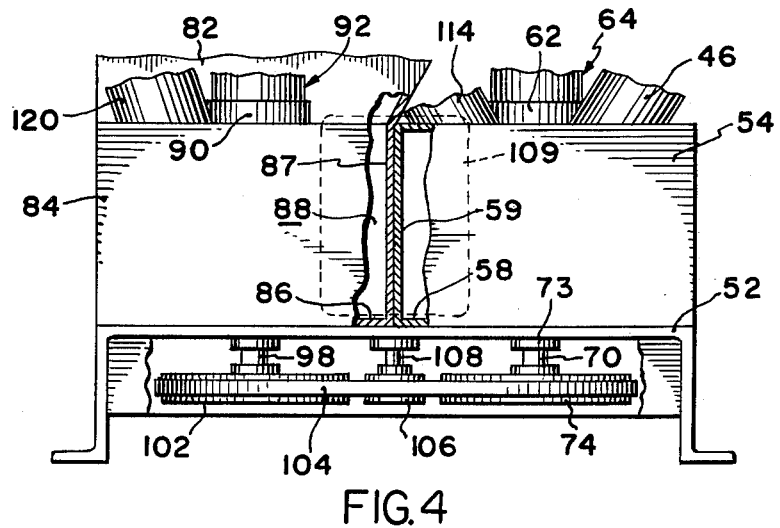
FIG. 4 is an end elevational view, partly broken away, illustrating the lower ends of the upstanding conveyors illustrated in FIG. 2.

Apparatus constructed according to the present invention is particularly adapted for use in supplying fluent solid materials, such as chicken feed $f$, from a bulk feed storage bin, silo or hopper, generally designated 10, to a plurality of feed troughs 12 disposed in an animal feed shelter, such as a chicken coop 14. A plurality of elevated rows of chicken cages 16 having spaced vertical bars 18 are disposed in the housing 14 for housing chickens which can pass their necks between the bars 18 and eat feed $f$ deposited in the feed troughs 12.

The feed silo or bin 10 is mounted on an upstanding framework, generally designated 20 and includes, at its lower end, an inverted cone shaped funnel section 22.

Figure 2:
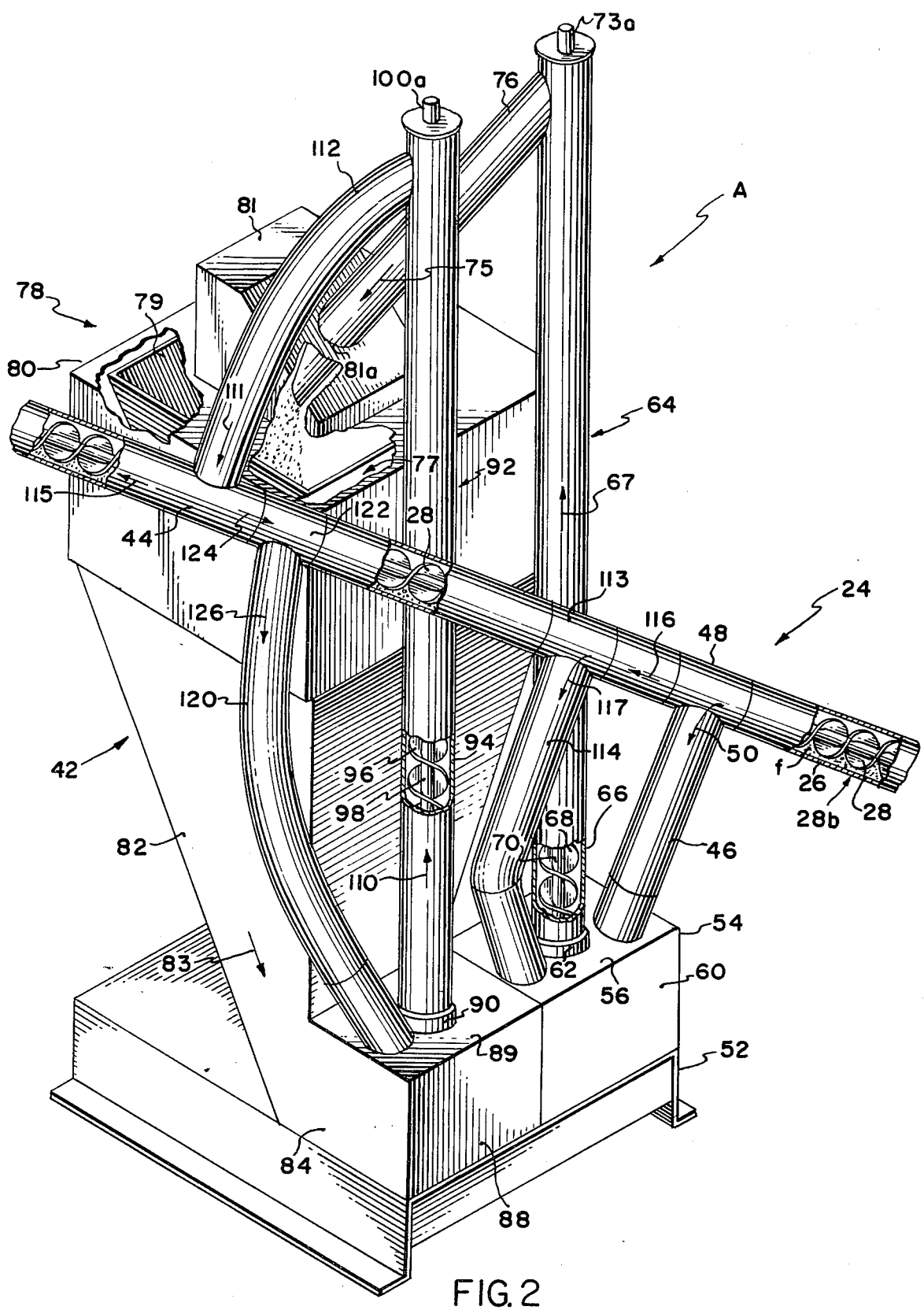
FIG. 2 is an enlarged perspective view of apparatus constructed according to the present invention.

A conveyor, generally designated 24, is provided for receiving feed $f$ from the cone shaped lower end 22 of the feed silo 10 and includes a hollow tube 26 (FIG. 2), having a horizontal tube section 38 joined to a vertically inclined tube portion 40, mounting a flexible, helical auger or screw 28 which is journaled in suitable bearings 29. The horizontal tube section 38 passes through an opening 37 in a sidewall of the coop 14 and the vertically inclined conveyor section 40 has a supply end 24a that receives the feed from the hopper 10. The auger 28 includes auger portions 28a and 28b, in the horizontal conveyor tube section 38 and the inclined conveyor tube section 40 respectively which may be joined at 36 via a universal coupling (not shown). A plurality of vertically extending drop tubes 30 are connected to the underside of the horizontal conveyor tube section 38 for receiving and delivering feed $f$ to the troughs 12. the feed auger 28 is driven via a coop supported, electrically driven motor 32 and a belt 34.

The helical auger 28 will move the feed $f$ received from the hopper section 22 vertically upwardly via section 28a and then horizontally to the vertical drop tubes 30 which direct the feed $f$ to the respective troughs 12.

Apparatus constructed according to the present invention is generally designated A and is illustrated in chain lines in FIG. 1. The apparatus A is more particularly illustrated in FIG. 2 and includes a portion of the conveyor tube section 40 as illustrated. The apparatus A also includes weighing and bypass mechanism, generally designated 42, for receiving the feed $f$ being conveyed by an upstream conveyor tube portion 48, of the conveyor tube 26 weighing the feed $f$, and then returning the feed $f$ to a downstream conveyor tube portion 44 of the conveyor tube 26. The weighing and bypass apparatus 42 includes a gravity fed supply tube 46 coupled to the upstream portion 48 of the conveyor tube 26. The feed $f$ in the conveyor tube 26 passes downwardly into the tube 46 as illustrated by the arrow 50.

The weighing and bypass apparatus 42 includes a base or stand 52 mounting a generally hollow, feed storage bin 54 having a bottom wall 58 supported via the base 52, opposed, sidewalls 59, opposed end walls 60 and a top wall 56. An opening is cut in the top wall 56 for receiving the lower end of the gravity fed material supply tube 46.

The upper wall 56 of the bin 54 for the unweighed feed f includes a flange 62 receiving the lower end of an upstanding conveyor generally designated 64. The upstanding conveyor 64 includes a hollow tube 66 receiving a helical feed auger or screw 68 having a drive shaft 70 journalled for rotation in bearings 73 provided in the underlying frame 52. A pulley 74 is fixed to the lower end of auger shaft 70 for rotatably driving the auger 68 to move grain or feed f upwardly from the bin 54 and discharging it to a hollow, vertically downwardly inclined, gravity fed transfer tube 76 connected to the upper end of the tube 66. The upper end of the auger shaft 70 is journalled in a bearing 73a provided at the upper end of the tube 66.

The weighing and bypass apparatus 42 includes a weighing assembly, generally designated 78, having a housing 80 removably mounted on a frame supported, downwardly converging funnel or duct 82. The weighing assembly 78 includes a weighing device 77 mounted internally of the hood 80. The weighing device 77 is identical to that disclosed in U.S. Pat. No. 3,458,002 granted to the applicant herein, and the patent is incorporated herein by reference as though fully set forth herein. The weighing device 77 is a gravity operated machine having a feed receiving bucket 79 which receives grain from the vertically inclined transfer conduit 76. The tube or conduit 76 terminates within the hood 80 in spaced relation with the bucket 79 to permit a repairman to inspect the bucket without interrupting the weighing operation. The housing 80 mounts a cowling 81 having an opening 81a which slidably receives the conduit 76 such that the housing 80 can be removed from the duct 82 and slid upwardly on the conduit 76 to enable repairmen to have access to the weighing bucket 79 without interrupting the weighing operation. As the bucket 79 fills to a predetermined level, it tips about an axis under the force of gravity. The bucket dumps the weighed grain or feed f into the downwardly converging duct 82 which funnels the grain f to a stroage bin 84 mounted atop the framework 52.

The feed storage bin 84 for the weighed feed f includes a bottom wall 86 supported on the framework 52, opposed sidewalls 87, opposed end walls 88 and a top wall 89. A flange 90 is provided in the top wall 89 and mounts a second upstanding conveyor, generally designated 92, having a tubular member 94 receiving a rotary, spiral auger or screw 96 having a shaft 98 journalled at its lower end in bearings 100 provided in the frame 52 and bearings 100a at the top of the tubular member 94. A pulley 102 is fixed to the lower end of the auger shaft 98 and is driven via a belt 104 which is trained around a pulley 102, the pulley 74, and a pulley 106 fixed to the motor shaft 108 of an electrical motor 109 mounted on the frame 52. The auger 96 moves the grain or feed f in the bin 84 upwardly, in the direction of the arrow 110, and discharges the grain to a downwardly inclined discharge tube 112 coupled to the upper end of tube 94 which directs the feed, in the direction of the arrow 111 to the discharge conveyor tube portion 44 of the conveyor 24.

The apparatus 42 also includes an overflow conduit 114 connected to a conveyor tube section 113 the conveyor tube 26 for receiving any feed material f which inadvertently moves upstream of the gravity fed duct, 46, in the direction represented by the arrow 116. Any feed material f which passes the gravity fed conduit 46 in the direction of the arrow 116 will be directed downwardly in the direction of the arrow 117 into the overflow or drop conduit 114 which is connected at its lower end to the bin 54 to comingle the overflow grain with the feed or grain deposited via the gravity fed tube 46 The apparatus 42 also includes a "catch" tube or bypass duct 120 which is connected to a conveyor tube portion 122 intermediate the downstream conveying tube portion 44 and the conveyor portion 113. The bypass duct 120 receives any feed f which is returned to the conveyor tube section 44 via the discharge tube 112 and which inadvertently slides rearwardly or upstream in the direction of the arrow 124. Any feed f which falls downwardly in the direction of the arrow 124 through the bypass tube 120, in the direction of the arrow 126, into the bin 84, will be commingled with the grain f which was previously weighed and deposited in the bin 84 as represented by the arrow 83. The overflow conduit 114 insures that all of the feed is passed through the weighing assembly 78 and is not inadvertently moved to the discharge conveyor tube section 44 without passing through the weighing assembly.

The catch tube 120 insures that the feed f which inadvertently moves upstream, in the direction of the arrow 124, is not recycled and reweighed as it would be if it moved downwardly and passed through the intake ducts 114 and 46. The bypass duct 120 becomes particularly important when the conveyor section 40 is inclined at an angle X (FIG. 1), to the horizontal, which is greater than 45°. When the angle X exceeds 45°, grain will increasingly tend to fall upstream in the direction of the arrow 124, after it is returned to the conveyor tube section 44.

Apparatus constructed according to the present invention can be installed on existing systems having a conveyor 24 by merely cutting appropriate holes in the conveyor tube 26 and connecting the apparatus 42 thereto. The weighing and bypass apparatus 42 and the portion of conveyor 24 between conveyor tube portions 48 and 44 are connected in parallel circuit relation but feed f will only be conveyed in the conveyor 24 between tube sections 48 and 44 if the weighing and bypass apparatus 42 fails to successfully operate.

THE OPERATION

In operation, grain and other suitable poultry feed f is deposited in the supply end 24a of the conveyor 24. The auger or helical screw 28 conveys the feed f upwardly where it is deposited in the gravity feed tube 46 for passage to the bin 54 as illustrated by the arrow 50. Any feed f which inadvertently passes the opening in the upper end of the tube 46 will be received in the overflow tube 114 for passage to the bin 54 for storing unweighed feed. The auger 70 in the upstanding conveyor auger 68 moves the unweighed feed f from the feed storage bin 54 upwardly in the direction of the arrow 67, and discharges it to the vertically inclined tube 76 for movement in a downwardly inclined path as represented by the arrow 75. The feed is discharged from the tube 76 to the weigher assembly bucket 79. When the bucket 79 fills, the force of gravity causes the bucket to swing about its horizontal axis and deposit the feed f into the duct 82 as represented by the arrow 83. The feed f is directed downwardly to the bin 84 for storing weighed feed f. The number of times that the bucket trips is recorded and the total quantity of feed is calculated such that the farmer knows precisely the amount of feed being fed.

The conveyor auger 96 than moves the weighed feed f upwardly from the bin 84 and discharges it into the gravity fed conveyor 112 which guides the feed f downwardly in the direction of the arrow 111 to the conveyor tube section 44 for continued movement by the auger 28 downstream in the direction represented by the arrow 115. The weighed feed f will pass to the horizontally disposed conveyor tube section 38 and continue to be moved to the drop tubes 30 where it is passed to the troughs 12 to be consumed by the chickens.

If the drive belt 104 breaks and the weigher assembly 78 thus becomes inoperative, feed f will fill in the tubes 46, 114 and 120 and the portion of the auger 28 between conveyor tube sections 48 and 44 will forward the feed f upwardly in the direction of the arrow 115 directly toward the outlet conveyor tube section 44 and bypass the weighing and bypass apparatus 42. The auger 28 will continue to supply feed to the horizontally disposed conveyor tube section 38 such that the chickens can continue to be fed even though the weighing assembly 78 is not weighing the feed.

A repairman can periodically inspect the weighing assembly 78 by removing the hood 80 from the duct 82 and sliding it upwardly on the tube 76.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. Apparatus for feeding fluent solid material, such as animal feed, comprising:
   a conveying line for conveying material in a downstream path of travel;
   means for weighing the conveyed material;
   conveyor bypass means including
      a feed supply line connected to an upstream portion of said conveying line and to said weighing means for directing feed from said conveying line to said weighing means; and
      a feed discharge line connected to said weighing means and a downstream portion of said conveying line for returning weighed feed from said weighing means to said conveying line for continued movement by said conveying line in said downstream path of travel;
   said conveying line including means for passing said material from said upstream portion to said downstream portion if said conveyor bypass means is inadvertently rendered inoperative.

2. The apparatus as set forth in claim 1 wherein said conveying means comprises a rotatable auger which is operable to convey said material past said feed supply line and said weighing means toward said downstream portion if said conveyor bypass means fails to properly operate.

3. In a conveying system for conveying material such as feed and the like in a downstream path of travel,
   means for receiving the material from an upstream conveyor portion of said conveying system and directing it out of said path of travel;
   means receiving the material from said receiving means for weighing the material removed from said conveying means; and
   means for returning the weighed material to a portion of said conveying system downstream of said upstream conveyor portion for continued transfer by said conveying system in said downstream path of travel;
   said conveying system including failsafe means for conveying the material past said weighing means to said downstream portion of said conveying system in the event one of said receiving means and said weighing means fails to operate so that a fail safe system of material flow is maintained.

4. A feeder system for feeding poultry a precise amount of feed at a feeding station comprising:
   a conveyor for receiving feed at a feed supply station and conveying it in a downstream path of travel toward said feeding station;
   bypass means connected to said conveyor including a feed extracting member connected to an upstream portion of said conveyor for extracting the feed from said conveyor and a feed return member for returning feed to said conveyor at a downstream portion of said conveyor for continued conveyance by said conveyor in said downstream path toward said feeding station;
   means connected to said feed extracting member and to said feed discharge member for determining the quantity of feed being fed prior to its return to said conveyor;
   said conveyor including fail safe means for conveying feed from said feed supply station past at least a portion of said bypass means and said quantity determining means toward said feeding station in the event one of said bypass means and said quantity determining means is disabled.

5. The system as set forth in claim 4 wherein said conveyor includes auger means inclined upwardly in said downstream path for upwardly conveying material from said supply station, said upstream portion of said conveyor being at a level lower than the level of said downstream portion of said conveyor.

6. The system as set forth in claim 5 wherein said bypass means includes a gravity fed section disposed at a lower level than the level of said upstream portion for receiving the material from said conveyor and transferring said material to said quantity determining means; said bypass means including material transfer means for conveying material from said quantity determining means to a level above said downstream portion and then discharging said material to said downstream portion.

7. The system as set forth in claim 5 wherein said bypass means includes a conveyor section for receiving said material from said upstream portion and thence conveying it upwardly and transferring it to said quantity determining means, said bypass means including material transfer means receiving material from said quantity determining means and reconveying said material upwardly to a level above the level of said downstream portion and discharging said material to said downstream portion.

8. The system as set forth in claim 4 wherein said bypass means includes a gravity fed section for receiving material from said conveyor and conveying it to a level lower than the level of said upstream conveyor portion, said bypass means including means for conveying said feed upwardly to a level above said downstream portion and discharging said material to said downstream portion for continued movement by said conveyor.

9. The system as set forth in claim 8 wherein said bypass means includes an additional gravity fed section connected to said conveyor between said first mentioned gravity fed section and said downstream portion for exiting any material which inadvertently failed to pass to said first mentioned gravity fed section and joining the unweighed material removed with the unweighed material first removed by said first mentioned gravity fed section.

10. The system as set forth in claim 9 wherein said bypass means includes a third gravity fed section downstream of said second section and upstream of said downstream portion for exiting any of said returned material which inadvertently moves in an upstream path from said downstream portion toward said upstream portion.

11. The system as set forth in claim 4 wherein said conveyor is inclined so as to upwardly convey said material in said downstream path of travel; said bypass means including a conveyor section connected to said conveyor between said upstream and downstream portions for removing any of said returned material which inadvertently moves upstream from said downstream portion to said upstream portion and joining it with the weighed material.

12. A system for feeding animals and the like comprising:
   a conveying line for moving feed or the like in an inline, downstream path of travel from a supply station toward a discharge station; and
   feed weighing and bypass means for causing said feed to bypass a portion of said conveying line and weighing said feed including a feed inlet connected to an upstream portion of said conveying line for receiving conveyed feed to be weighed and a feed outlet connected to a downstream portion of said conveying line for discharging weighed feed to said conveying line for continued movement via said conveying line in said downstream path of travel to said discharge station;
   said conveying line being operative to convey feed from said supply station past said feed inlet and said feed outlet to said discharge station in the event said feed weighing and bypass means is inadvertently rendered inoperative.

13. The system as set forth in claim 12 wherein said conveying line comprises a hollow tube and an auger rotatably mounted in said tube for conveying feed within said tube.

14. A system for delivering material such as feed or the like from a supply station to a discharge station such as an animal feed station comprising:
   a conveyor for upwardly conveying material from said supply station in a downstream path of travel to said discharge station;
   bypass means for receiving material from an upstream portion of said conveyor and conveying it to a level below the level of said upstream portion and then conveying said material upwardly to a level above a downstream portion of said conveyor; and
   means connected in circuit with said bypass means for weighing the removed material;
   said bypass means including means for returning said weighed material to said downstream portion and discharging it to said downstream portion of said conveyor for continued travel toward said discharge station.

15. The system as set forth in claim 14 wherein said bypass means includes a first exit section connected to said upstream portion for removing material from said upstream portion, said bypass means including a second exit section connected to said conveyor between said upstream and downstream portions for removing any remaining unweighed material which was inadvertently not removed by said first exit portion and has inadvertently traveled downstream toward said downstream portion.

16. The system, as set forth, in claim 14 wherein said bypass means includes conveyor section means connected to said conveyor between said upstream and downstream portions for removing any of said returned material which inadvertently moves upstream from said downstream portion and joining it with the weighed material.

17. The system as set forth in claim 14 wherein said conveyor comprises a tubular member mounting a rotary auger for moving the material through said tubular member; said bypass means including
   a gravity fed conveyor section connected to said upstream portion for conveying said material downwardly to a level below the level of said upstream portion;
   a first upstanding conveyor section mounting a rotatable auger for receiving the material from said gravity fed section and conveying it upwardly to a level above the level of said upstream portion and discharging it to said weighing means;
   a second upstanding conveyor section mounting a second rotatable auger for receiving the weighed material from said weighing means at a level below said downstream portion and reconveying it upwardly to a level above the level of said downstream portion and discharging said weighed material to said downstream portion for continued movement by said rotary auger in said first mentioned conveyor.

18. A system for feeding animals and the like comprising:
   means for supplying material to be fed;
   feed weighing means, receiving said material from said supply means, for weighing the materials;
   means for receiving the weighed material from said feed weighing means and transferring it to a discharge station such as a poultry feeder or the like; and
   bypass conveying means for conveying the material from said supply means to said transferring means to bypass said weighing means in the event said feed weighing means is disabled.

19. The system as set forth in claim 18 wherein said means for supplying material comprises a conveyor duct delivering feed to said weighing means, said feed weighing means including a movable feed storage and weighing mechanism and a removable hood overlying said mechanism, said hood being mounted for sliding movement on said conveyor duct between a position overlying said mechanism and a removed position to permit a repairman to inspect the feed storage and weighing mechanism without interrupting operation of said weighing means.

20. The system as set forth in claim 19 wherein said conveyor duct is disposed above said mechanism and terminates in spaced relation thereto to facilitate inspection of said mechanism without interrupting the operation thereof.

21. A method of conveying fluent solid material from a supply station to a discharge station comprising the steps of:
- supplying material from a supply station to a weighing station;
- weighing the material delivered to said weighing station;
- discharging the weighed material to a discharge station such as a feeder or the like; and
- conveying said material from said supply station past said weighing station to said discharge station to bypass said weighing station in the event said step of weighing is inadvertently interrupted.

* * * * *